United States Patent [19]

Kreitzberg

[11] 4,085,834

[45] Apr. 25, 1978

[54] VALVE ASSEMBLY FOR POWER SHIFT TRANSMISSION

[75] Inventor: Ernest A. Kreitzberg, Mukwonago, Wis.

[73] Assignee: Allis-Chalmers Corporation, Milwaukee, Wis.

[21] Appl. No.: 710,907

[22] Filed: Aug. 2, 1976

[51] Int. Cl.² .................................................. F16D 25/10
[52] U.S. Cl. ........................... 192/87.13; 192/109 F; 192/4 A; 74/364
[58] Field of Search .............. 192/109 F, 87.13, 87.18, 192/87.19, 3.57

[56] References Cited

U.S. PATENT DOCUMENTS

| 3,656,600 | 4/1972 | Kitano et al. | 192/109 F |
| 3,964,585 | 6/1976 | Murayama et al. | 192/87.13 |

FOREIGN PATENT DOCUMENTS

| 1,221,119 | 2/1971 | United Kingdom | 192/109 F |

*Primary Examiner*—Benjamin W. Wyche
*Attorney, Agent, or Firm*—Arthur L. Nelson

[57] ABSTRACT

A valve assembly for a power shift transmission with a valve body and valve cover integrally mounted on the transmission housing. The valve body includes flow control valves while the valve cover includes pressure control valves for regulating and modulating fluid pressure supplied through the valve assembly to hydraulic fluid clutch actuators in the power shift transmission.

10 Claims, 7 Drawing Figures

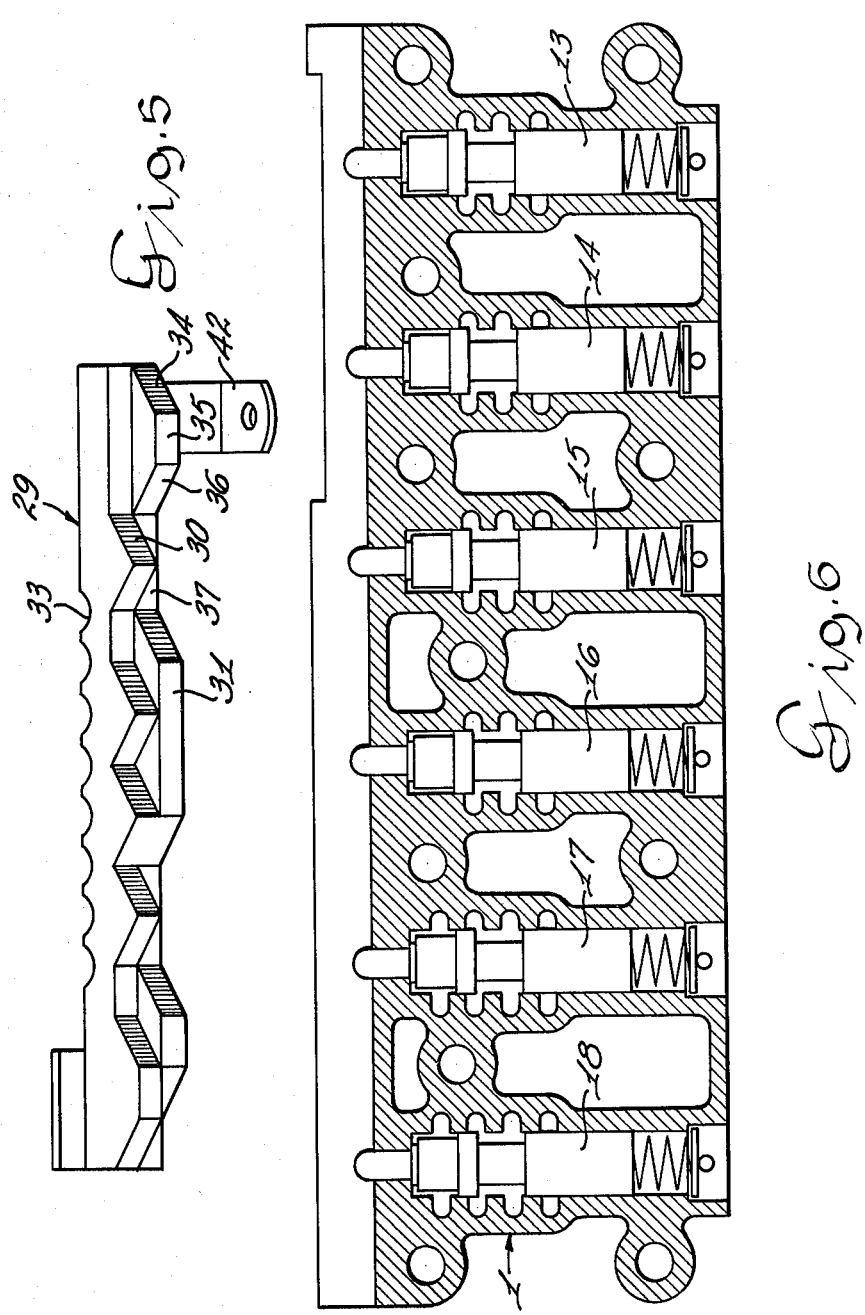

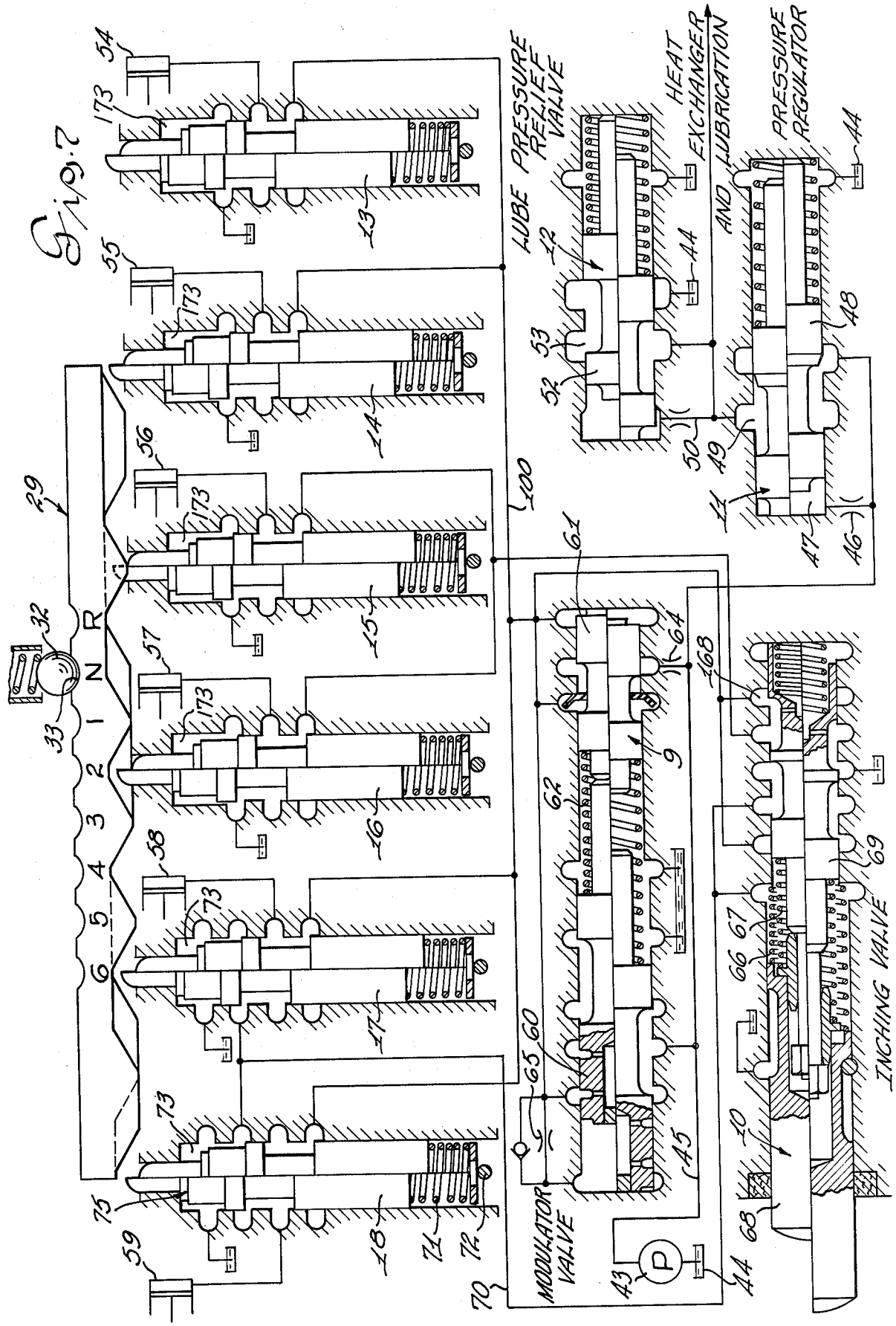

VALVE ASSEMBLY FOR POWER SHIFT TRANSMISSION

This invention relates to a vehicle power shift transmission and more particularly to a valve assembly having a valve body and a valve cover integrally mounted on a transmission housing. A plurality of flow control valves are included in the valve body with the pressure control valves in the valve cover for regulating the hydraulic fluid flow and pressure to hydraulic fluid actuators in the power shift transmission. Pressure control valves modulate the pressure rise as clutches are engaged and also the operating pressure maintained in the hydraulic actuators of the power shift transmission during operation.

The conventional power shift transmission on a vehicle requires valving to control the hydraulic fluid pressure supplied to the transmission during normal operating conditions and also modulation of the hydraulic fluid pressure as the pressure decays in a hydraulic actuator for the clutch being disengaged and the rate of pressure rise in the hydraulic actuator for the clutch which is being engaged. The regulation of the pump pressure is also required for normal operation of the clutches in the power shift transmission and a pressure limiting valve limits excessive pressure in the system at any time. The flow control valves normally control the operation of the selected hydraulic actuators for the clutches being engaged or disengaged and accordingly a plurality of flow control valves are required in such a transmission. Normally, these valves are mounted individually on the vehicle with controls for operation of the valves. Often, this requires an elaborate arrangement of supports, conduits and control mechanisms to provide the operation of the power shift transmission.

Accordingly, this invention provides for the assembly of all the flow control valves in the valve body of the valve assembly while the pressure control valves are mounted in a valve cover to modulate the hydraulic fluid pressure as it is applied to the clutches for operation in the power shift transmission. The valve body and valve cover are integrally mounted on the transmission housing with a suitable operating linkage and cam arrangement to selectively operate the power shift transmission. This provides a compact arrangement for the valves necessary to operate the power shift transmission and control means which operate the valves of selective clutches in the power shift transmission to vary the speed ratio and to direction of drive through the power shift transmission as may be desired. The valve assembly is adapted for operation with a power shift transmission as illustrated in the U.S. Pat. No. 3,929,037 of James E. Marsh.

Accordingly, it is an object of this invention to provide the valve assembly for controlling a power shift transmission.

It is another object of this invention to provide a valve assembly including a valve body with flow control valves and a valve cover including pressure control valves with suitable operating means for controlling the flow and pressure of hydraulic fluid supplied to the power shift transmission.

It is another object of this invention to provide integral valve body and valve cover with flow control valves to selectively direct the flow of pressurized fluid to selective hydraulic actuators in the clutches of the power transmission and pressure control valves including the modulator valve, an inching valve, a regulator valve and a relief valve to control the pressure from the hydraulic pump and the rate of pressure rise and fall as it is supplied through the flow control valves selectively engaged clutches in the power shift transmission.

The objects of this invention are accomplished by providing an integral structure of a valve body and valve cover which are mounted on a transmission housing. The valve body includes a plurality of flow control valves which are cam operated through manual control means. The pressure is regulated through a pressure regulating valve and peak pressures are limited through a pressure relief valve in the hydraulic system. The modulator valve modulates the pressure as it is supplied through the flow control valves to control the rate of pressure rise to a hydraulic clutch actuator in which a clutch is being engaged and the rate of pressure decay is controlled by a dash pot arrangement in the flow control valve so that transition of power from the disengaging clutch to the engaging clutch is smoothly transferred during shifting of the power shift transmission. Accordingly, the valve assembly provides a compact arrangement of all operations in controlling the pressure and flow of hydraulic fluid for operating of the power shift transmission. Suitable mechanical operating means for operating the valves is provided in the valve assembly.

The preferred embodiment of this invention is illustrated in the attached drawings.

FIG. 5 is a view of the rack with the cam surfaces for operating the plurality of flow control valves.

FIG. 6 is a cross section view taken from line VI—VI of FIG. 2.

FIG. 7 is a schematic illustration of the hydraulic circuit including the valves in the valve assembly.

Figure 1:
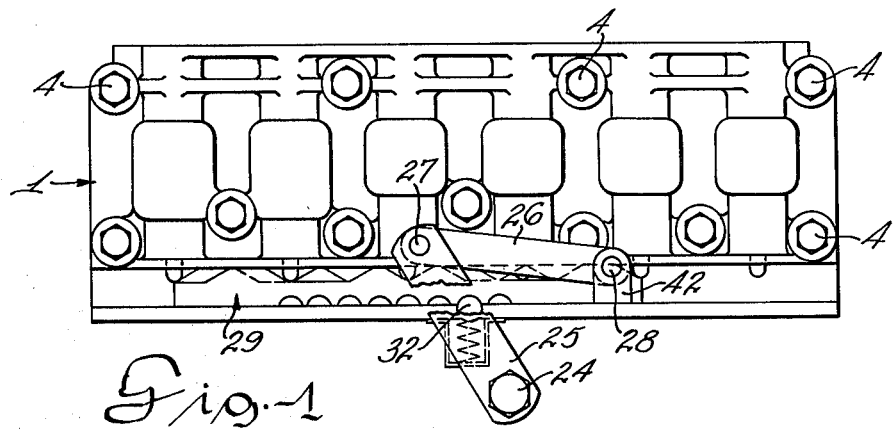
FIG. 1 illustrates a side elevation view of the valve assembly taken from the inside of the valve assembly.
Figure 2:
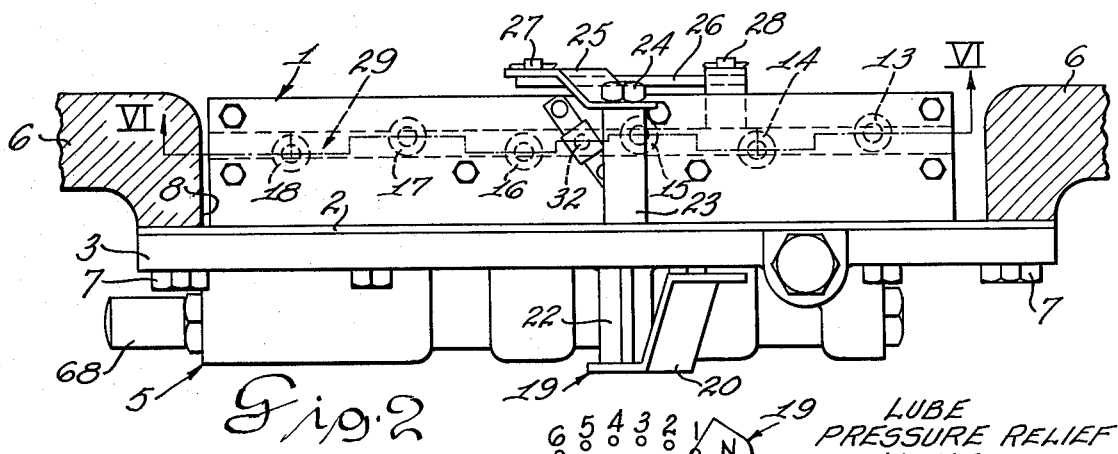
FIG. 2 illustrates a top view of a valve assembly mounted on the transmission housing.
Figure 3:
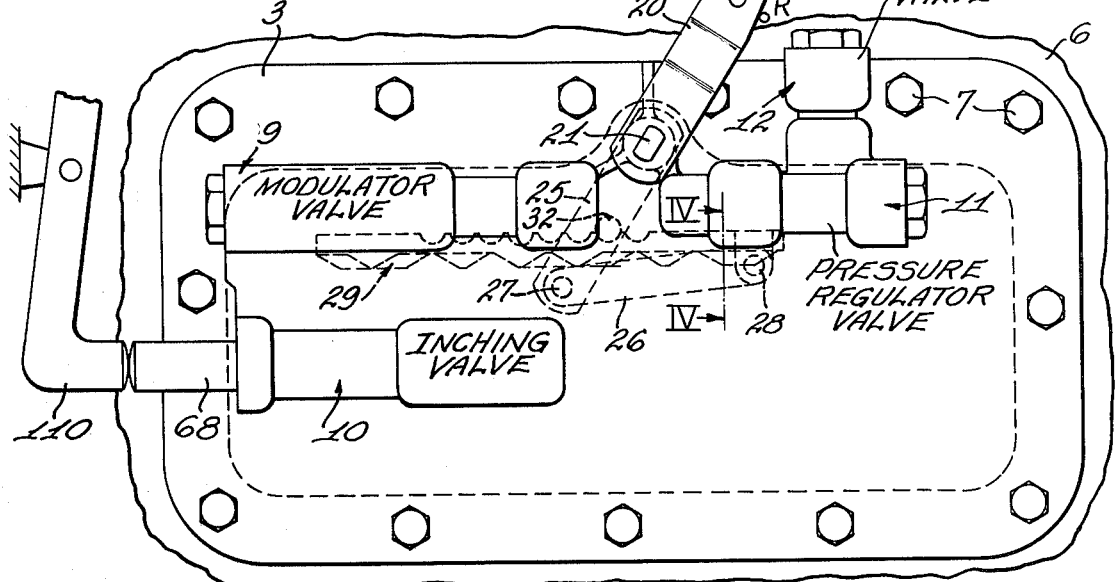
FIG. 3 is a side elevation view taken from the outside of the valve assembly.

The valve assembly is generally shown in FIGS. 1 through 6 and illustrates the various components in the valve. FIG. 7 illustrates the schematic diagram of valve assembly. FIG. 1 shows the valve assembly from the internal side of the valve. FIG. 2 illustrates the top view of the valve assembly mounted in the transmission housing, while FIG. 3 shows the external side of the valve assembly as it is mounted on the vehicle power shift transmission housing.

Figure 4:
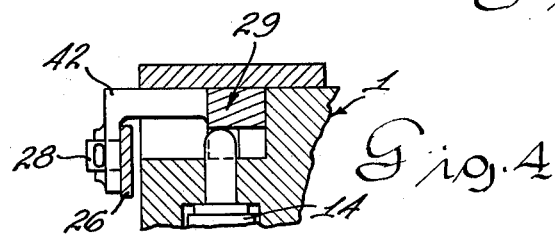
FIG. 4 is a cross section view taken on line IV—IV of FIG. 3.

The valve body 1 is fastened to the separator plate 2 which is sandwiched between the valve body 1 and the valve cover 3. A plurality of bolts 4 fasten the valve body 1 to the valve cover 3. The bolts 4 extend through the separator plate 2 and threadedly engage openings in the valve cover 3. The valve assembly 5 is mounted on the transmission housing 6 by a plurality of bolts 7. The opening 8 receives the valve assembly through which the valve body 1 extends to the inside of the transmission housing 6. The valve cover 3 is cast to form supporting structure for the modulator valve 9 and the inching valve 10, pressure regulator valve 11, and the pressure relief valve 12. These four valves control the pressure of the hydraulic fluid from the pump as it is transmitted through the valve assembly to the hydraulic actuators in the power shift transmission. The plurality of flow control valves, 13, 14, 15, 16, 17 and 18 are operated by the control mechanism 19. The control mechanism includes a control arm 20 connected to a shaft 21 which is rotatably mounted in the bearing 22 of the valve cover 3. The shaft 21 extends through the valve cover 3 and bearing 23 and is fastened by the nut 24 to the arm 25. The arm 25 is pivotally connected to the link 26 by the pin 27. The pin 28 pivotally connects the link 26 to the valve control rack 29. The valve control rack 29 is shown in FIGS. 4 and 5. The double cam surfaces 30 and 31 control the flow control valves 13, 14, 15, 16, 17 and 18. The staggered arrangement of these valves is shown in FIG. 2. As the control rack 29 is reciprocated, selected cams of the cam surfaces 30 and 31 engage the valve stems of the flow control valves 13, 14, 15, 16, 17 and 18.

The control rack 29 has six forward positions for the transmission with a neutral and a reverse position. The rack is reciprocated to selectively engage the valve stems as the detent 32 selectively engages one of a plurality of detent grooves 33 in the control rack 29. The cam surface 31 is broken up in increments for example, the surfaces 34, 35 and 36 cause the cam to rise, dwell and fall, respectively. The surface 35 engages a valve stem when the valve is actuated. It can be seen that the surface 31 actuates the spool valves 17, 15 and 13, while the surface 30 actuates the spools 18, 16, 14, respectively. The double cam surfaces 30 and 31 permit the use of a shorter rack and closer positioning of the valves in the valve body.

The control arm 25 is pivotally connected through the link 28 and sleeve 41, to the arm 42 of the control rack 29. The rotational movement of the control lever 20 and control arm 25 reciprocates the control rack 40 to selectively actuate the flow control valves in the valve body. The modulator valve 9, inching valve 10, pressure regulating valve 11 and pressure relief valve 12 are shown in the schematic diagram shown in FIG. 7 together with the flow control valves.

The pressure regulator valve 11 receives pressurized fluid from the pump 43. The pump 43 is connected to the sump 44 and pressurizes fluid in the conduit 45 which is connected to the pressure regulator valve 11. Pressurized fluid in conduit 45 passes through the orifice 46 into the chamber 47 biasing the plunger 48 to the position shown in the lower half of the pressure regulator valve 11. This allows pressurized fluid to flow through the chamber 49 into the conduit 50 onto the heat exchanger and the lubrication circuit for the power shift transmission. The operating pressure is approximately 190 pounds per square inch in the conduit 50, and if the pressure falls below the 190 pounds per square inch, the regulator valve moves in the left-hand position as shown in the upper half of the valve which closes communication between the conduit 45 and conduit 50. Excess pressure in the circuit and conduit 50 will cause the lubrication pressure relief valve 12 to move to the right-hand position as shown in the upper half of the plunger 52. This permits the fluid flow from the chamber 53 to sump 44.

The modulator valve 9 controls the pressure of pressurized fluid of the pump 43 which is supplied to the hydraulic actuators 54, 55, 56, 57, 58 and 59 through the plurality of flow control valves 13, 14, 15, 16, 17 and 18. The function of the modulator valve is to provide correct pressure overlap during the shift and to control the rate of pressure rise in the oncoming or engaging clutch. The valve is unbalanced to the right due to the larger diameter of plunger 60 relative to the piston 61. The normal position of the valve at operating pressure will be displaced to the right as shown in the upper half of the valve. When the hydraulic pressure downstream of the valve drops below 100 pounds as a clutch valve opens, the spring 62 forces the plunger 60 and piston 61 apart. Passages in the right-hand end of the modulator valve cease to feed the clutch circuit 100 to the flow control valves. Since all the oil required to feed the clutch must pass orifice 64, this insures that the clutch pressure will drop until the plunger 60 has traveled to its left-most position. At that point, the plunger 60 allows unrestricted flow between the pump and clutch circuit 100 as shown in the lower half of the modulator valve. This prevents any further pressure drop in the clutch circuit. When the oil flow to the clutch circuit ceases, the pressure returns to the system and both valves will compress the spring 62. Pressurized fluid flowing through the orifice 65 biases the plunger 60 to the right-hand position. This will cause the plunger to move slowly to the right. This will limit the rate of clutch pressure rise until the spool 60 has fully returned to the right-hand position. The circuit through the valve on the left-hand end of the modulator valve reopens and the plunger 60 returns to the position shown in the top section of the valve. This prevents the orifice 64 from dropping pressure in the clutch circuit.

The inching valve 10 is a manual control valve operated by lever 100 which regulates the pressure to the hydraulic actuators 56, 57, 58 and 59. The inner spring force of the springs 66 and 67 forces the valve open depending on the position of plunger 68. Oil from the clutch passage 100 is directed to the right-hand side of the valve into the passage 168 and opposes the inner spring force. The valve acts as a variable regulator controlling the position of the piston 69. When the plunger 68 is moved to the extreme left position, the inching valve moves to the left and energizes clutches 58 and 59. This combination locks the ouput shaft and allows the range transmission to be shifted. Hydraulic actuators for clutches 58 and 59 are fed through the conduit 70. These passages are open during normal functioning of the inching valve as the drain to sump is closed. Also, all of the clutches except clutches 58 and 59 are dropped before the brake system is energized.

The clutch valves are operated by the control rack which is programmed to depress the correct flow control valve sequence as it traverses across the top of each spool. Each clutch valve will deliver oil to one clutch. The lower portion of the flow control valve contains a spring 71 mounted on the pin 72 which normally biases the valve to a closed position. When the modulator plunger 60 moves to the left, each of the engaging clutches operates in the same manner through its mating flow control valve. As the mating flow control valve is closed, fluid from the hydraulic actuator is vented to sump. The fluid in the chamber 73 and chamber 173 operates as a dashpot which limits the rate of flow from the dashpot chamber 73 or chamber 173 to sump. This controls the rate of pressure decay in the hydraulic actuator for the clutch. Accordingly, the rate of pressure rise is controlled by the modulator valve and the rate of pressure decay is controlled by the dashpot 75 in the upper or stem end of the flow control valve.

The valve assembly includes a valve body, including the flow control valves, which is bolted to the separtor plate 2 and the valve cover 3 to form a unitary structure which can be mounted on the transmission housing 6.

The valve assembly is mounted on the transmission housing for connection to suitable controls for operation by the operator of the vehicle. The use of the valve assembly provides a compact arrangement for all of the valves required to operate a power shift transmission. A hydraulic pump driven by the engine is connected by passage means through the valves to the power shift transmission. Accordingly, there is no need for additional brackets, supports and external conduits connecting the various valves for controlling the flow and pressure of the fluid in operation of the power shift transmission.

The embodiments of the invention in which an exclusive property or privilege is claimed are defined as follows:

1. A valve assembly for a power shift transmission comprising, a valve body, means adapting said valve assembly for mounting on a transmission housing having an opening for receiving said valve body, means defining a plurality of flow control valves in said valve body adapted for connection to a plurality of hydraulic actuators in the power shift transmission, resilient means normally biasing each of said flow control valves to a closed position, a valve actuator mounted in said valve body for actuating said flow control valves, means defining cammed surfaces on said valve actuator for selectively and alternatively biasing each of said flow control valves to an open position, a valve cover for covering said opening in said transmission and integrally connected with said valve body including means defining pressure control valves including a modulator valve and a pressure regulator valve, a control lever pivotally mounted on said valve cover, a mechanism pivotally connected to said control lever and said valve actuator, detent means selectively positioning said valve actuator in a selected one of a plurality of positions, inlet passage means adapted for connecting to a pump, connecting passage means connecting said inlet passage means to said pressure regulator valve for regulating pressure from said pump in said inlet passage means, said connecting passages connecting said inlet passage to said modulator valve, and flow control passage means connecting said modulator valve to said flow control valves for supplying modulated pressurized fluid through said flow control valves to the hydraulic actuators in the power shift transmission.

2. A valve assembly for a power shift transmission as set forth in claim 1 wherein said valve cover defines a pressure regulator valve connected to said inlet passage means for limiting peak pressures in said inlet passage means.

3. A valve assembly for a power shift transmission as set forth in claim 1 including an inching valve and manual means for operating said inching valve to control the modulation of pressure in said valve assembly.

4. A valve assembly for a power shift transmission as set forth in claim 1 wherein said valve actuator includes a valve control rack, said means defining cammed surfaces defines a double row of cammed surfaces for selectively operating said flow control valves, said flow control valves each define a spool and a valve stem engaging one of said cammed surfaces for selective operation of said flow control valve.

5. A valve assembly for a power shift transmission as set forth in claim 1 including a control lever, means pivotally supporting said control lever on said valve cover, actuating means connecting said control lever with valve actuator for operating said flow control valve.

6. A valve assembly for a power shift transmission as set forth in claim 1 including a pivotally mounted lever, means pivotally mounting said lever on said valve cover, a valve operating arm connected to said lever, means pivotally connecting said valve operating arm to said valve actuator for operating the flow control valve.

7. A valve assembly for a power shift transmission as set forth in claim 1 including means reciprocally mounting said valve actuator in said valve body.

8. A valve assembly for a power shift transmission as set forth in claim 1 wherein each of said flow control valves includes a valve spool, a valve stem connected to said valve spool for engaging a cammed surface of said valve actuator for operating each of said flow control valves.

9. A valve assembly for a power shift transmission as set forth in claim 1 including a control lever, means pivotally supporting said control lever on said valve cover, a shaft connected to said lever extending through said valve cover and said valve body, a valve operating arm connected to said shaft, said valve actuator defining a control rack for reciprocal movement in said valve body, linkage connecting said valve operating arm to said control rack for operating said control rack, detent means for selectively positioning said control rack in one of the selected number of positions for operating said power shift transmission.

10. A valve assembly for a power shift transmission as set forth in claim 1 including means defining a plurality of bores in parallel relationship in said valve body, a spool in each of said bores forming each of said flow control valves, a stem on each of said spools extending to engage a cammed surface of said valve actuator, mechanical means for reciprocally moving said valve actuator for operating said flow control valves for shifting said power shift transmission.

* * * * *